United States Patent
Miura et al.

(10) Patent No.: US 11,059,482 B2
(45) Date of Patent: Jul. 13, 2021

(54) TRAVELLING SUPPORT APPARATUS

(71) Applicant: DENSO CORPORATION, Kariya (JP)

(72) Inventors: Takeshi Miura, Kariya (JP); Masao Ohoka, Kariya (JP); Koji Fujiki, Kariya (JP); Takahiro Narita, Kariya (JP)

(73) Assignee: DENSO CORPORATION, Kariya (JP)

( * ) Notice: Subject to any disclaimer, the term of this patent is extended or adjusted under 35 U.S.C. 154(b) by 244 days.

(21) Appl. No.: 16/074,533

(22) PCT Filed: Feb. 2, 2017

(86) PCT No.: PCT/JP2017/003725
§ 371 (c)(1),
(2) Date: Aug. 1, 2018

(87) PCT Pub. No.: WO2017/135355
PCT Pub. Date: Aug. 10, 2017

(65) Prior Publication Data
US 2019/0039617 A1    Feb. 7, 2019

(30) Foreign Application Priority Data

Feb. 2, 2016  (JP) .............................. JP2016-018114

(51) Int. Cl.
*B60W 30/165*    (2020.01)
*B60T 7/14*    (2006.01)
(Continued)

(52) U.S. Cl.
CPC ......... *B60W 30/165* (2013.01); *B60K 28/066* (2013.01); *B60Q 1/346* (2013.01);
(Continued)

(58) Field of Classification Search
CPC .... B60W 30/165; B60W 30/09; B60W 40/09; B60K 28/066; B60Q 1/346; B60Q 1/46;
(Continued)

(56) References Cited

U.S. PATENT DOCUMENTS 6,313,758 B1    11/2001  Kobayashi
6,393,361 B1 *  5/2002   Yano ........................ B60T 7/14
340/436
(Continued)

FOREIGN PATENT DOCUMENTS

JP    H7-200991 A    8/1995
JP    2000-339599 A    12/2000
(Continued)

*Primary Examiner* — Hussein Elchanti
(74) *Attorney, Agent, or Firm* — Maschoff Brennan (57) ABSTRACT

A travelling support apparatus includes: a communication section that communicates with a vehicle around an own vehicle; a state determination section that determines whether a driver is capable of driving appropriately; a path setting section that sets an evacuation path for bringing the own vehicle to an emergency stop on the basis of a certain algorithm when the state determination section determines that the driver is incapable of driving appropriately; an information acquisition section that acquires various types of information required for execution of the algorithm; an evacuation control section that performs evacuation traveling to bring the own vehicle to the emergency stop along the evacuation path set by the path setting section; and an information transmitting section that transmits, to the vehicle around the own vehicle via the communication section, information indicating that the own vehicle performs the evacuation traveling.

6 Claims, 7 Drawing Sheets

(51) Int. Cl.
*B60R 21/00* (2006.01)
*G08G 1/16* (2006.01)
*B60Q 5/00* (2006.01)
*B60Q 1/52* (2006.01)
*B60K 28/06* (2006.01)
*B60Q 1/46* (2006.01)
*B60Q 1/34* (2006.01)
*B60W 30/09* (2012.01)
*B60W 40/09* (2012.01)
*G06K 9/00* (2006.01)
*B60W 40/08* (2012.01)
*B60W 50/04* (2006.01)
*G05D 1/02* (2020.01)

(52) U.S. Cl.
CPC ............... *B60Q 1/46* (2013.01); *B60Q 1/52* (2013.01); *B60Q 5/005* (2013.01); *B60R 21/00* (2013.01); *B60T 7/14* (2013.01); *B60W 30/09* (2013.01); *B60W 40/09* (2013.01); *G08G 1/162* (2013.01); *G08G 1/166* (2013.01); B60W 2040/0818 (2013.01); B60W 2050/046 (2013.01); B60W 2420/42 (2013.01); B60W 2420/52 (2013.01); B60W 2540/215 (2020.02); B60W 2540/26 (2013.01); B60W 2556/65 (2020.02); B60W 2754/30 (2020.02); B60W 2756/10 (2020.02); G05D 1/0221 (2013.01); G05D 1/0246 (2013.01); G05D 1/0278 (2013.01); G06K 9/00845 (2013.01)

(58) Field of Classification Search
CPC .......... B60Q 1/52; B60Q 5/005; B60R 21/00; B60T 7/14; G08G 1/162; G08G 1/166
See application file for complete search history.

(56) References Cited

U.S. PATENT DOCUMENTS

| | | | |
|---|---|---|---|
| 2007/0124063 A1* | 5/2007 | Kindo | G08G 1/09675 701/517 |
| 2010/0214087 A1* | 8/2010 | Nakagoshi | B60K 28/066 340/436 |
| 2014/0341434 A1* | 11/2014 | Lin | B60R 1/00 382/104 |
| 2015/0183441 A1* | 7/2015 | Aoki | G08G 1/167 434/62 |
| 2015/0191176 A1* | 7/2015 | Kobana | B60K 28/06 701/70 |
| 2015/0203126 A1* | 7/2015 | Kobana | B60K 28/06 701/93 |

FOREIGN PATENT DOCUMENTS

| | | |
|---|---|---|
| JP | 2007-331652 A | 12/2007 |
| JP | 2014-58229 A | 4/2014 |
| WO | 2015/190329 A1 | 12/2015 |

* cited by examiner

| MODE | MESSAGE TO OTHERS | EVACUATION VEHICLE (LIGHTING) | EVACUATION VEHICLE (SOUND) | OTHERS <EXCLUDING LEFT ITEM> (SOUND AND DISPLAY) | OTHERS <IMMEDIATELY AHEAD> (SOUND AND DISPLAY) |
|---|---|---|---|---|---|
| 1 | ASK OTHERS TO CONFIRM POSITION OF EVACUATION VEHICLE | HAZARD LAMPS AND HORN | THIS IS TO INFORM OTHERS OF THE POSITION OF THIS VEHICLE. | THERE IS AN EVACUATION VEHICLE AHEAD (BEHIND/ON THE RIGHT/ON THE LEFT). (DISPLAY) PLEASE CHECK THE VEHICLE ISSUING A WARNING BY ITS HAZARD LAMPS AND HORN. (SOUND) | THERE IS AN EVACUATION VEHICLE IMMEDIATELY BEHIND. (DISPLAY) PLEASE CHECK THE VEHICLE ISSUING A WARNING BY ITS HAZARD LAMPS AND HORN. (SOUND) |
| 2 | INFORM OTHERS THAT EVACUATION ASSISTANCE IS TO BE STARTED | HAZARD LAMPS AND HORN | EVACUATION ASSISTANCE WILL BE STARTED | EVACUATION ASSISTANCE WILL BE STARTED IN THE VEHICLE. (SOUND) | EVACUATION ASSISTANCE WILL BE STARTED IN THE VEHICLE. |
| 3 | REQUEST EVACUATION GUIDANCE | HAZARD LAMPS AND HORN ※ | — | — | PLEASE GUIDE THE VEHICLE TO A SAFE PLACE. PLEASE PRESS THE ACCEPTANCE SWITCH TO ACCEPT THE REQUEST. (SOUND) |
| 4 | INFORM OTHERS OF PATH | HAZARD LAMPS AND HORN※ | — | THE EVACUATION VEHICLE WILL DECELERATE AND MOVE TO THE LEFT SIDE STRIP TO STOP. (SOUND) DISPLAY EVACUATION PATH ※ | PLEASE GUIDE THE VEHICLE TO A SAFE PLACE. (SOUND) |
| 5 | ASK OTHERS TO AVOID EVACUATION VEHICLE AND EVACUATION PATH | HAZARD LAMPS AND HORN ※ | — | PLEASE KEEP A DISTANCE FROM THE EVACUATION VEHICLE. PLEASE KEEP OUT OF THE PATH FOR THE VEHICLE MOVING TO THE LEFT SIDE STRIP. (SOUND) | PLEASE GUIDE THE VEHICLE TO A SAFE PLACE. (SOUND) |
| 6 | INFORM OTHERS THAT EVACUATION ASSISTANCE IS BEING PERFORMED (CONTINUED COMMUNICATION) | HAZARD LAMPS AND HORN | EVACUATION ASSISTANCE IS BEING EXECUTED | EVACUATION ASSISTANCE IS BEING EXECUTED. (SOUND) | EVACUATION ASSISTANCE IS BEING EXECUTED. (SOUND) |
| 7 | INFORM OTHERS THAT EVACUATION ASSISTANCE IS FINISHED | HAZARD LAMPS AND HORN | EVACUATION ASSISTANCE WILL BE FINISHED | EVACUATION ASSISTANCE WILL BE FINISHED. (SOUND) | EVACUATION ASSISTANCE WILL BE FINISHED. (SOUND) |

Mode 3 branches: REFUSE REQUEST FOR EVACUATION GUIDANCE → Mode 4; ACCEPT REQUEST FOR EVACUATION GUIDANCE → Mode 5.

※HEADLAMPS AND BRAKE LAMPS CAN BE USED TOGETHER   ※OPTIONAL FOR EVACUATION GUIDANCE

TRAVELLING SUPPORT APPARATUS

CROSS-REFERENCE TO RELATED APPLICATION

The present international application claims priority to Japanese Patent Application No. 2016-018114 filed on Feb. 2, 2016, the entire contents of which are incorporated herein by reference.

TECHNICAL FIELD

The present disclosure relates to a technique for bringing a vehicle whose driver is incapable of driving appropriately to an emergency stop.

BACKGROUND ART

Conventionally, techniques are proposed for determining a vehicle stop position when detecting that a driver has a low level of consciousness and is not capable of driving the vehicle normally (that is, appropriately), and for evacuating the vehicle to the vehicle stop position to forcibly bring the vehicle to an emergency stop.

Techniques for use in conjunction with such control are also proposed. For example, PTL 1 discloses blinking hazard lamps and sounding a horn so that vehicles and pedestrians around an own vehicle are informed of the dangerous situation.

CITATION LIST

Patent Literature

[PTL 1] JP 2007-331652 A

SUMMARY OF THE INVENTION

However, the inventors have found the following problem through their detailed study. Specifically, merely blinking hazard lamps and sounding a horn cannot make the drivers of the vehicles around the own vehicle recognize what kind of danger they are in. This leads to the following problem: the vehicles around the own vehicle may hinder the own vehicle from evacuating to a vehicle stop position.

An aspect of the present disclosure preferably provides a technique for preventing vehicles around an own vehicle whose driver is no longer capable of driving appropriately from hindering control for bringing the own vehicle to an emergency stop.

A travelling support apparatus according to an aspect of the present disclosure includes a communication section, a state determination section, a path setting section, an information acquisition section, an evacuation control section, and an information transmitting section.

The communication section communicates with a vehicle around an own vehicle. The own vehicle is a vehicle equipped with the travelling support apparatus. The state determination section determines whether a driver is capable of driving appropriately. The path setting section sets an evacuation path for bringing the own vehicle to an emergency stop on the basis of a certain algorithm when the state determination section determines that the driver is incapable of driving appropriately. The information acquisition section acquires various types of information required for execution of the algorithm. The evacuation control section performs evacuation traveling to bring the own vehicle to the emergency stop along the evacuation path set by the path setting section.

Therefore, for example, if a driver has a decreased level of consciousness and is not capable of driving the vehicle appropriately, the state determination section can detect that situation, and the information acquisition section, the path setting section, and the evacuation control section can bring the own vehicle to an emergency stop through evacuation traveling.

In addition, the information transmitting section transmits, to the vehicle around the own vehicle via the communication section, information indicating that the own vehicle performs the evacuation traveling. Therefore, the vehicle around the own vehicle that has received the transmitted information can adjust the state of traveling so as not to hinder the evacuation traveling.

In addition, a travelling support apparatus according to another aspect of the present disclosure may include a communication section and a traveling instruction section. The communication section communicates with a vehicle around an own vehicle. The own vehicle is a vehicle equipped with the travelling support apparatus. The traveling instruction section provides, to the own vehicle, a method of traveling so as to prevent the own vehicle from hindering evacuation traveling of an evacuation vehicle when receiving information indicating that the evacuation traveling is performed from the vehicle around the own vehicle via the communication section. The evacuation vehicle is a vehicle that performs the evacuation traveling. Therefore, the driver drives the own vehicle in accordance with the method of traveling provided by the traveling instruction section, or the own vehicle is automatically driven in accordance with the method of traveling provided by the traveling instruction section. As a result, the own vehicle is prevented from hindering the evacuation traveling of the evacuation vehicle.

It is noted that reference signs in parentheses described in the claims indicate correspondence relations with specific means described in the following embodiments as an aspect, and do not limit the technical scope of the present invention.

The above and other objects, characteristics, and advantages of the present disclosure will be further clarified in the following detailed description with reference to the accompanying drawings. Below is a brief description of the drawings.

BRIEF DESCRIPTION OF DRAWINGS

FIG. 3 is an explanatory diagram illustrating examples of various modes set in the process.

DESCRIPTION OF EMBODIMENTS

Hereinafter, embodiments for implementing the invention will be described with reference to the drawings. Note that the following description is applied to areas with left-hand traffic rules in which vehicles such as cars are required to keep to the left. However, right and left in the following description are respectively replaced by left and right in areas with right-hand traffic rules.

1. First Embodiment

[1-1. Configuration]
[1-1-1. Overall Configuration]

Figure 1:
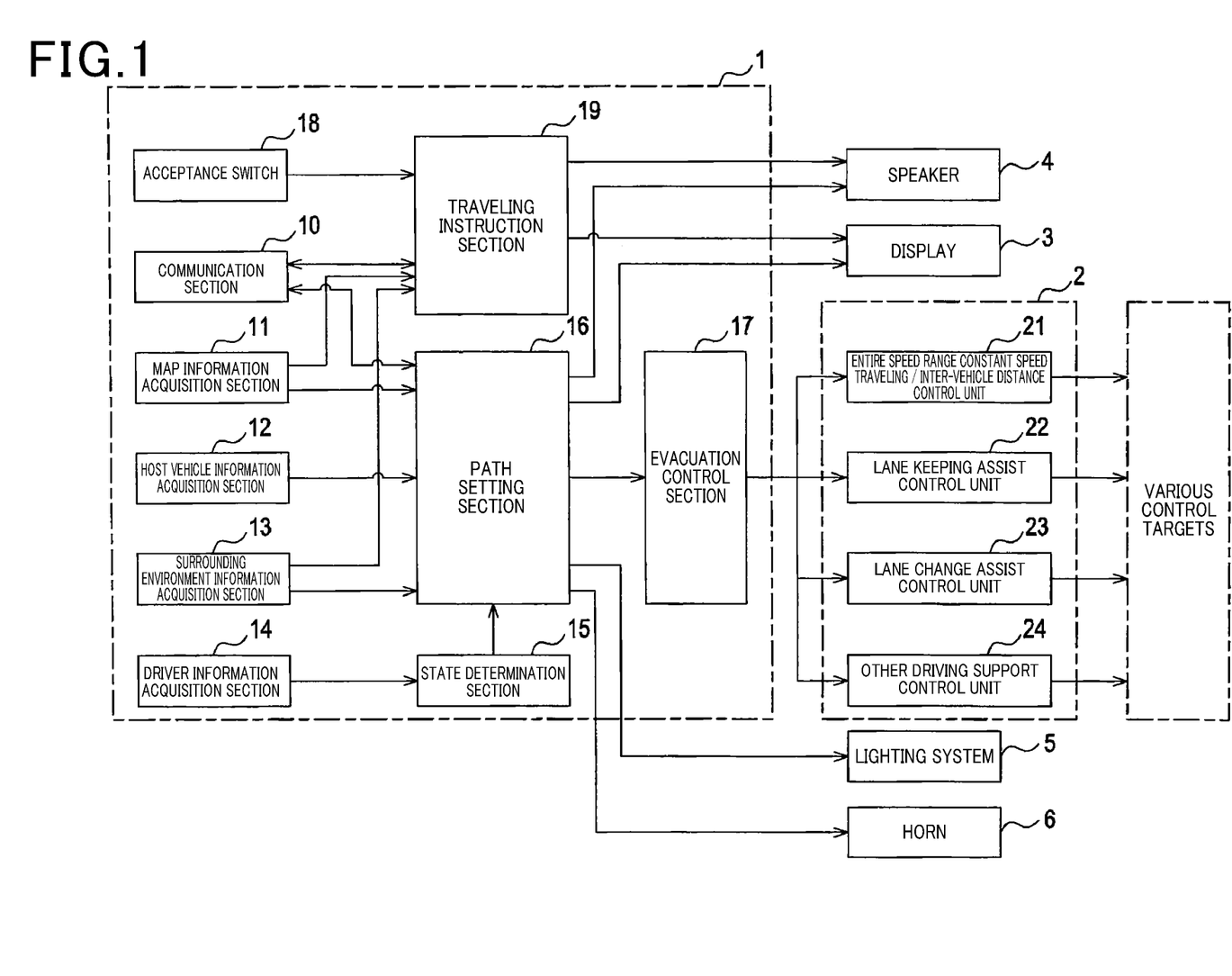
FIG. 1 is a block diagram illustrating a configuration of a travelling support apparatus and units that operate in cooperation with the travelling support apparatus.

A travelling support apparatus 1 illustrated in FIG. 1 includes a microcomputer or the like mounted in a vehicle. The travelling support apparatus 1 is an apparatus that provides driving support in cooperation with a driving support system 2, a display 3, a speaker 4, a lighting system 5, and a horn 6 provided in the vehicle.

The driving support system 2 includes, for example, an entire vehicle speed range constant speed traveling/inter-vehicle distance control unit (e.g., all-vehicle speed ACC) 21, a lane keeping assist control unit (e.g., LKA) 22, a lane change assist control unit (e.g., LCA) 23, other driving support control units 24, and the like. It is note that ACC is an abbreviation of Adaptive Cruise Control, LKA is an abbreviation of Lane Keep Assist, and LCA is an abbreviation of Lane Change Assist. The other driving support control units 24 can include an antilock braking system, a collision damage mitigation braking system, a stability control system, and the like.

Each of the control units 21 to 24 constituting the driving support system 2 includes what is called an electronic control unit (e.g., ACC-ECU, LKA-ECU, LCA-ECU, and the like), and is connected to the travelling support apparatus 1 via an in-vehicle LAN. Normally, each of the control units 21 to 24 is operated in accordance with an instruction from a driver or predetermined driving operations. It is noted that the ECU is an abbreviation of Electronic Control Unit.

When the driving support system 2 is instructed by the travelling support apparatus 1 on evacuation traveling, the driving support system 2 is activated in accordance with the instruction. Specifically, each of the control units 21 to 24 computes specific data required for deceleration control, lane keeping control, lane changing control, rear-end collision preventing control, and the like in consideration of a speed of the own vehicle, a linear shape of the road, and presence or absence of a following vehicle. It is noted that the own vehicle used herein means a vehicle equipped with the travelling support apparatus 1.

The driving support system 2 then controls various control targets on the basis of the results of computation provided by the control units 21 to 24 to perform accelerator control, brake control, steering control, and the like on various control targets, whereby the desired vehicle motion control is performed. It is note that these systems constituting the driving support system 2 are known techniques, and thus are not described in any more detail herein.

The display 3 is a device capable of displaying a map and the like. The speaker 4 is a device capable of generating various types of sounds such as language. The display 3 and the speaker 4 may be specially provided for the travelling support apparatus 1. Alternatively, for example, a built-in display and a built-in speaker of a car navigation system, an in-vehicle audio instrument, and meters on a head-up display or the like may also serve as the display 3 and the speaker 4. The lighting system 5 can include various lights that emit light to the outside of the own vehicle, such as headlamps, tail lamps, brake lamps, and direction indicators. The direction indicators are provided on the right and left of the vehicle, and the right and left direction indicators also function as hazard lamps when blinking together. The horn 6 is a well-known device that is also referred to as a Klaxon horn or a warning horn.

[1-1-2. Configuration of Travelling Support Apparatus]

The travelling support apparatus 1 includes a communication section 10, a map information acquisition section 11, an own vehicle information acquisition section 12, a surrounding environment information acquisition section 13, a driver information acquisition section 14, a state determination section 15, a path setting section 16, an evacuation control section 17, an acceptance switch 18, and a traveling instruction section 19.

The communication section 10 at least executes inter-vehicle communication (what is called V2V) with another vehicle. It is noted that V2V means vehicle-to-vehicle communication. In addition, the communication section 10 may also be able to execute road-vehicle communication (what is called V2X) and pedestrian-vehicle communication (what is called V2P). It is noted that V2X means vehicle-to-x communication, and V2P means vehicle-to-pedestrian communication.

The map information acquisition section 11 acquires map information related to a region to which the own vehicle is likely to travel. The map information includes, for example, road linear shape information, lane information, connection point information, road boundary information, and the like. Among them, the road linear shape information includes information such as a curvature, a grade, and changing points thereof. In addition, the lane information includes information such as the number of lanes, types of lanes, and the length and width of each lane. It is noted that the types of lanes include driving lanes, fast lanes, climbing lanes, evacuation roads, road shoulders, right/left-turning lanes, merging roads, exit roads, and the like. The connection point information includes information such as intersections, junctions, merging points, crosswalks, and railroad crossings. The road boundary information includes information such as guardrails, walls, gutters, poles, blocks, fences, and cliffs. The map information accumulated in advance in an in-vehicle storage device may be acquired, or necessary information may be acquired through communication with off-vehicle facilities. These methods may be used in combination.

The own vehicle information acquisition section 12 acquires own vehicle information, which relates to the state of the own vehicle. The own vehicle information includes, for example, an operation state of the direction indicators, a speed of the vehicle, acceleration (including deceleration) of the vehicle, a manipulation variable of the steering wheel, and the like detected by a direction indicator sensor, a speed sensor, an acceleration sensor, a steering angle sensor, and the like.

The surrounding environment information acquisition section 13 acquires surrounding environment information, which relates to an object that exists around the own vehicle. The surrounding environment information includes, for example, a distance to and a relative speed with respect to an object that exists around the vehicle, a current position of the vehicle, and the like. Such surrounding environment information is detected by using an image sensor, a radar sensor, a GPS sensor, a locator, and the like. The surrounding environment information also includes various types of information (e.g., the number of lanes and the lane in which the own vehicle is traveling) obtained by performing image processing on images obtained from the image sensor.

The driver information acquisition section 14 acquires driver information, which is information for determining whether a driver is capable of driving appropriately. The driver information includes, for example, feature amounts of the face and eyes of the driver extracted by processing images obtained from a camera that captures images of the driver, detection results provided by the steering angle sensor in which the driver's operation is directly reflected, biological information such as blood pressure and body temperature obtained from sensors attached to the driver, and the like.

The state determination section 15 determines whether the driver is capable of driving appropriately, for example, by estimating the driver's level of consciousness on the basis of the driver information acquired by the driver information acquisition section 14. It is noted that the state determination section 15 does not necessarily estimate the level of consciousness, but may detect arm or neck cramps or the like. In the present embodiment, the state where "the driver is capable of driving appropriately" refers to a state where the driver's body or consciousness does not have any abnormality that may cause some trouble in driving.

The path setting section 16 executes, for example, a process of setting a stop position at which the own vehicle is stopped and an evacuation path to the stop position when the state determination section 15 determines that the driver is not capable of driving appropriately. The process of the path setting section 16 will be described in detail later.

The evacuation control section 17 performs vehicle motion control for evacuation traveling by generating and outputting an instruction for the driving support system 2 in accordance with the stop position and evacuation path set by the path setting section 16. It is noted that in the following description, a vehicle that performs evacuation traveling under the control of the evacuation control section 17 is also referred to as an evacuation vehicle.

The acceptance switch 18 is a switch that is pushed when the driver of the own vehicle accepts a request to guide an evacuation vehicle if the evacuation vehicle is present around the own vehicle, as described later. The acceptance switch 18 may be a general push-button switch. In a case where the display 3 is configured as a touch panel, the acceptance switch 18 may be provided as an image displayed on the display 3.

If an evacuation vehicle is present around the own vehicle, the traveling instruction section 19 executes, for example, a process of providing a method of traveling of the own vehicle so as to prevent the own vehicle from hindering the evacuation traveling of the evacuation vehicle. In this process, the method of traveling is provided to the driver of the own vehicle via, for example, the display 3 and the speaker 4. The process of the traveling instruction section 19 will be described in detail later.

It is noted that the travelling support apparatus 1 mainly includes a microcomputer provided with a well-known CPU and a well-known memory. Various functions of the travelling support apparatus 1 are implemented when the CPU executes a program stored in a non-transitory tangible storage medium. In this example, the memory corresponds to a non-transitory tangible storage medium in which a program is stored. In addition, a method corresponding to the program is executed upon execution of the program. It is note that one or more microcomputers may constitute the travelling support apparatus 1.

The travelling support apparatus 1 includes the communication section 10, the map information acquisition section 11, the own vehicle information acquisition section 12, the surrounding environment information acquisition section 13, the driver information acquisition section 14, the state determination section 15, the path setting section 16, the evacuation control section 17, the acceptance switch 18, and the traveling instruction section 19 as a functional configuration that is implemented when the CPU executes the program. The method of implementing components of each of the sections constituting the travelling support apparatus 1 is not limited to software, but some or all of the components may be implemented by using hardware including a combination of logic and analog circuits.

[1-2. Processes]
[1-2-1. Process of Path Setting Section]

Next, a path setting process that is executed by the path setting section 16 will be described with reference to the flowchart illustrated in FIG. 2. This process is repeatedly executed at predetermined intervals while the power supply of the own vehicle is in an on state. It is noted that if the own vehicle includes an internal combustion engine, a period of time in which the power supply of the own vehicle is in an on state refers to a period of time in which the ignition key of the own vehicle is in ACC or ON.

Figure 2:
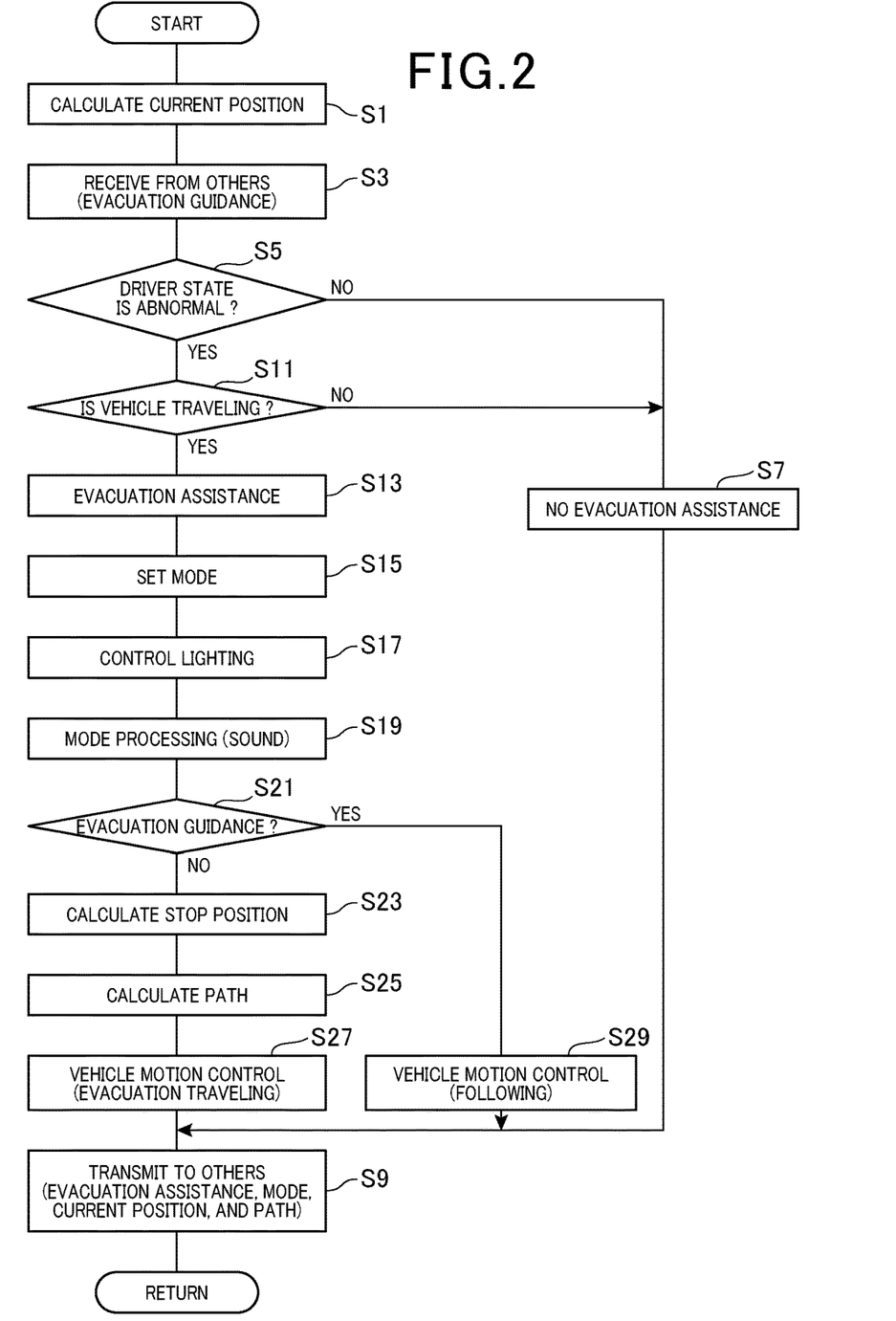
FIG. 2 is a flowchart illustrating a process of a path setting section of the travelling support apparatus.

As illustrated in FIG. 2, when the process starts, first in S1, the current position of the own vehicle is calculated on the basis of information acquired by the map information acquisition section 11 and the surrounding environment information acquisition section 13. In the subsequent S3, communication is established with vehicles around the own vehicle via the communication section 10 to refer to the state of a flag indicating that a vehicle is performing evacuation guidance (hereinafter referred to as an evacuation guiding flag) received from the vehicle around the own vehicle. It is noted that the evacuation guiding flag is reset immediately after the power supply of the own vehicle is turned on, which will be described in detail later.

In the subsequent S5, it is determined whether the state of the driver is abnormal, that is, whether the state determination section 15 has determined that the driver is incapable of driving appropriately. If it is determined that the state of the driver is not abnormal (that is, No), the process proceeds to S7 in which a flag indicating that the own vehicle is receiving evacuation assistance (hereinafter referred to as an evacuation assisting flag) is reset, and the process proceeds to S9.

In S9, various types of information are transmitted to vehicles around the own vehicle, and the process is halted. It is noted that in S9, information on the evacuation assisting flag is transmitted as one of the various types of information. If the evacuation assisting flag has been set, a mode of the evacuation assistance, the current position of the own vehicle, an evacuation path for the own vehicle, and the like are also transmitted. If the process proceeds from S7 to S9 as described above, since the evacuation assisting flag has been reset in S7, a mode of the evacuation assistance, the current position of the own vehicle, an evacuation path for the own vehicle, and the like are not transmitted.

The following description is mainly based on the assumption that the various types of information are transmitted to vehicles around the own vehicle in S9 through inter-vehicle communication. However, in S9, the various types of information may also be transmitted to infrastructure through road-vehicle communication, and the various types of information may further be transmitted to pedestrians around the own vehicle through pedestrian-vehicle communication. In a case where the various types of information are transmitted to infrastructure through road-vehicle communication, for example, information as to whether the own vehicle is receiving evacuation assistance can be provided to a traffic information center or the like. In a case where the various types of information are transmitted to pedestrians around the own vehicle through pedestrian-vehicle communication, for example, information as to whether the own vehicle is receiving evacuation assistance can be provided to the pedestrians around the own vehicle. It is note that the following description is based on the assumption that each vehicle traveling on a road includes the travelling support apparatus 1 of a similar type.

If it is determined in the above-mentioned S5 that the state of the driver is abnormal (that is, Yes), the process proceeds to S11 to determine whether the own vehicle is traveling. If it is determined that the own vehicle is not traveling (that is, No), the process proceeds to the above-mentioned S7. If it is determined that the own vehicle is traveling (that is, Yes), the process proceeds to S13.

In S13, the evacuation assisting flag is set. In the subsequent S15, a mode of evacuation assistance is set. As illustrated in FIG. 3, in order to deal with a situation where the own vehicle performs evacuation traveling in response to the determination that the state of the driver is abnormal, the travelling support apparatus 1 has the following modes of evacuation assistance (hereinafter simply referred to as modes) for the progress of the evacuation traveling.

Mode 1 is a mode for getting vehicles around an evacuation vehicle (own vehicle in this case) to confirm the position of the evacuation vehicle. Mode 2 is a mode for informing vehicles around the evacuation vehicle that evacuation assistance is to be started in the evacuation vehicle. Mode 3 is a mode for requesting a vehicle around the evacuation vehicle and immediately ahead of the evacuation vehicle to guide the evacuation vehicle. Mode 4 is a mode for informing vehicles around the evacuation vehicle of an evacuation path for the evacuation vehicle. Mode 5 is a mode for getting vehicles around the evacuation vehicle to avoid the evacuation vehicle and the evacuation path for the evacuation vehicle. Mode 6 is a mode for informing vehicles around the evacuation vehicle that evacuation assistance is being performed. Mode 7 is a mode for informing vehicles around the evacuation vehicle that evacuation assistance has been finished.

Returning to FIG. 2, in S15, one of the above-mentioned modes of the own vehicle is set on the basis of the state of the own vehicle acquired via the own vehicle information acquisition section 12 and the like. In the subsequent S17, the lighting system 5 and the horn 6 are controlled on the basis of the mode set in S15. That is, as illustrated in FIG. 3, the hazard lamps blink and the horn 6 sounds in each of the modes. However, in modes 3 to 6 in which the own vehicle is performing evacuation traveling, the headlamps and brake lamps may be used together so as to indicate the direction in which the own vehicle travels during the evacuation traveling. That is, control may be executed to cause the headlamps and brake lamps to blink to inform the own vehicle's surroundings of the dangerous situation, and to cause the direction indicators to inform the own vehicle's surroundings of the direction in which the own vehicle travels.

In the subsequent S19, a process of outputting the sound corresponding to a mode is executed via the speaker 4. As illustrated in FIG. 3, the sound "This is to inform others of the position of this vehicle" is output in mode 1, whereby the driver and passengers of the own vehicle are informed of the reason why the hazard lamps have blinked and the horn 6 has sounded. In mode 2, the driver and passengers are informed by sound that evacuation assistance is to be started. In mode 6, the driver and passengers are informed that evacuation assistance is being executed. In mode 7, the driver and passengers are informed that evacuation assistance is to be finished.

In the subsequent S21, it is determined whether the evacuation guiding flag received in S3 has been set. Since the evacuation guiding flag is reset immediately after the power supply of the own vehicle is turned on as described above, "No" is determined in S21, and the process proceeds to S23. In S23, a stop position at which the own vehicle should be brought to an emergency stop is calculated. This process includes, for example, defining possible traveling ranges for the own vehicle in a plurality of spots in each lane at predetermined intervals, evaluating the level of risk in each spot using a plurality of different perspectives, and setting a spot with a low level of overall risk as a candidate for the stop position. Examples of risks that are evaluated from a plurality of perspectives include a risk due to road shapes (e.g., curved roads, places near intersections, and the like) and surrounding circumstances, a risk that occurs when the own vehicle is stopped, a risk due to continuous evacuation traveling, and the like.

The risk due to surrounding circumstances varies, for example, according to the presence or absence of guardrails, protective walls, and the like. The risk that occurs when the own vehicle is stopped increases in the right lane of a road whose each way has multiple lanes or in the middle of a blind curve. The risk due to continuous evacuation traveling increases as the distance to the stop position increases. The method of calculating the stop position is not limited to this, but various methods can be employed. For example, the stop position may be calculated in consideration of the smoothness of the entire road traffic rather than the risk related to the own vehicle. In other words, the path setting section 16 only needs to set (that is, calculate) an evacuation path for bringing the evacuation vehicle to an emergency stop on the basis of a certain algorithm, and any information acquisition section may be prepared as long as various types of information required for execution of the algorithm can be acquired.

In the subsequent S25, an evacuation path for moving the own vehicle to the stop position calculated in S23 is calculated. In S27, vehicle motion control is executed via the evacuation control section 17 for causing the own vehicle to perform evacuation traveling along the evacuation path. Needless to say, the vehicle motion control includes not only causing the own vehicle to travel along the evacuation path but also executing other well-known control processes for collision avoidance or the like by the driving support control unit 24 or the like. The process proceeds from S27 to the above-mentioned S9, with the evacuation assisting flag being set in S13. Therefore, in S9, the current position of the own vehicle calculated in S1, the mode set in S15, and the evacuation path calculated in S25 are also transmitted.

As described later, in a case where a vehicle that leads and guides the own vehicle receiving evacuation assistance is present immediately ahead of the own vehicle, the evacuation guiding flag received in S3 is in a set state. In this case, "Yes" is determined in S21, and the process proceeds to S29. In S29, vehicle motion control for evacuation traveling is executed such that the own vehicle follows the vehicle traveling immediately ahead of the own vehicle, and the process proceeds to the above-mentioned S9.

[1-2-2. Process of Traveling Instruction Section]

A traveling instruction process that is executed by the traveling instruction section 19 will be described with reference to the flowchart illustrated in FIG. 4. This process is repeatedly executed at predetermined intervals while the power supply of the own vehicle is in an on state. It is noted that this process may be continuously executed before or after the above-mentioned path setting process, or may be executed in parallel with the path setting process.

Figure 4:
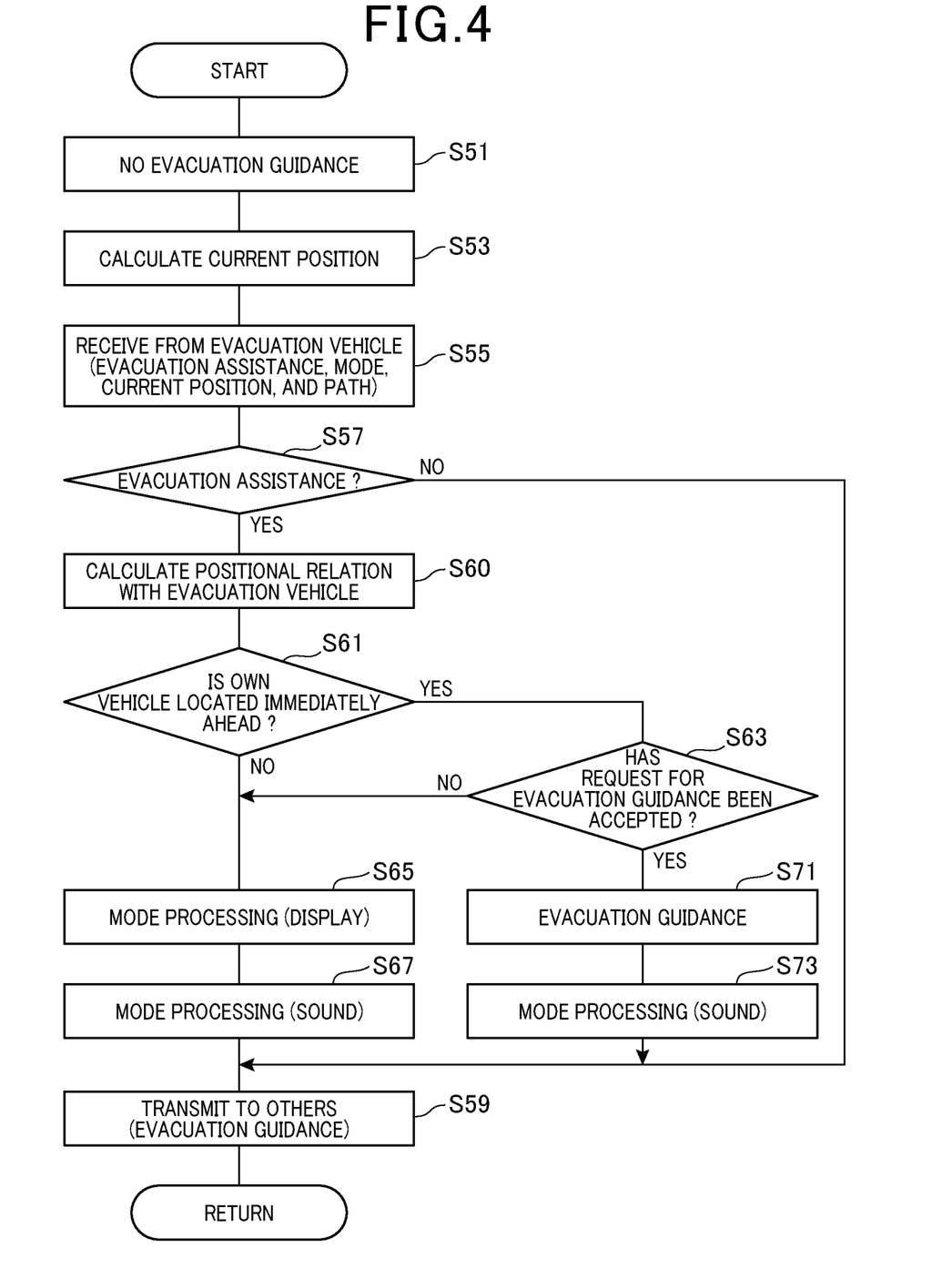
FIG. 4 is a flowchart illustrating a process of a traveling instruction section of the travelling support apparatus.

As illustrated in FIG. 4, the process starts in S51 by resetting the evacuation guiding flag. In the subsequent S53, the current position of the own vehicle is calculated in a manner as in S1. In S55, information transmitted from vehicles around the own vehicle in the process of the above-mentioned S9 is received. If an evacuation vehicle is present around the own vehicle, a mode, a current position, and an evacuation path are received in addition to the set evacuation assisting flag.

In the subsequent S57, it is determined whether the evacuation assisting flag included in the information received in S55 has been set. If it is determined that the evacuation assisting flag has not been set (that is, No), the process proceeds to S59 in which information on the evacuation guiding flag reset in S51 is transmitted to the own vehicle's surroundings, and the process is halted. Therefore, if the states of the drivers of vehicles around the own vehicle are not abnormal, and if the processes of S1, S3, S5, S7, and S9 are repeated in the path setting process of the vehicles around the own vehicle, the processes of S51, S53, S55, S57, and S59 are repeated in the traveling instruction process of the own vehicle.

In contrast, when an abnormality occurs in the driver of a vehicle around the own vehicle and information on the evacuation assisting flag set in S13 is received from the vehicle (namely, the evacuation vehicle), a "Yes" determination is made in S57, and the process proceeds to S60. In S60, information on the current position transmitted from the evacuation vehicle is compared with the current position of the own vehicle calculated in S53, whereby the positional relation between the own vehicle and the evacuation vehicle is calculated. In the subsequent S61, it is determined whether the own vehicle is located immediately ahead of the evacuation vehicle on the basis of the result of calculation in S60.

If it is determined in S61 that the own vehicle is located immediately ahead of the evacuation vehicle (that is, Yes), the process proceeds to S63 in which the operation state of the acceptance switch 18 is detected, whereby it is determined whether the driver of the own vehicle has accepted a request for evacuation guidance. The driver of the own vehicle has not yet pushed the acceptance switch 18 as of the time point at which the process proceeds to S63 for the first time due to the occurrence of an abnormality in the driver of a vehicle around the own vehicle. Therefore, it is determined in S63 that the driver has not accepted a request for evacuation guidance (that is, No), and the process proceeds to S65.

In S65, the display process corresponding to a mode received in S55 is executed via the display 3. In the subsequent step S67, the sound output process corresponding to the mode is executed via the speaker 4, and the process proceeds to the above-mentioned S59. It is noted that the display process that is executed in S65 and the sound output process that is executed in S67 vary according to the result of determination in S60.

As illustrated in FIG. 3, in a case where the mode received in S55 is mode 1, for example, if the own vehicle is located behind the evacuation vehicle, the written message "There is an evacuation vehicle ahead" is displayed on the display 3 in S65, and the sound "Please check the vehicle issuing a warning from its hazard horn" is output from the speaker 4 in S67. It is noted that the term "ahead" on the display is replaced by "behind", "on the right", "on the left", or "immediately behind, depending on the position of the evacuation vehicle with respect to the own vehicle. The simple term "behind" is used when the own vehicle is located ahead of the evacuation vehicle with another vehicle interposed therebetween. In a case where the mode received in S55 is mode 2 that is set after mode 1, the sound "Evacuation assistance will be started in the vehicle" is output in S67 regardless of the positional relation between the own vehicle and the evacuation vehicle.

In a case where the mode received in S55 is mode 3, if the own vehicle is located immediately ahead of the evacuation vehicle, the sound "Please guide the vehicle to a safe place. Please push the acceptance switch to accept the request" is output in S67. If the driver pushes the acceptance switch 18 in response to the sound output, "Yes" is determined in the above-mentioned S63. Then, the evacuation guiding flag is set in S71, the sound corresponding to the mode is output in S73, and the process proceeds to the above-mentioned S59. In this case, since the evacuation guiding flag is set in S71, information on the set evacuation guiding flag is transmitted to the own vehicle's surroundings in S59.

As illustrated in FIG. 3, if the request for evacuation guidance is accepted in the manner, the sound "Please guide the vehicle to a safe place" is output in S73 while mode 4 or mode 5 is received in S55. In response to the sound output, the driver of the vehicle located immediately ahead of the evacuation vehicle guides the evacuation vehicle by driving the own vehicle such that the following evacuation vehicle moves to the left side strip. It is noted that since it can take some time for the driver of the vehicle located immediately ahead of the evacuation vehicle to push the acceptance switch 18, the request for evacuation guidance in mode 3 is desirably continued for a certain period of time in consideration of that time.

Then, once mode 6 subsequent to modes 4 and 5 is received in S55 after the lapse of time, the evacuation-guiding vehicle located immediately ahead of the evacuation vehicle outputs the sound "Evacuation assistance is being executed" in S73. Once mode 7 set when the evacuation vehicle stops is received in S55, the sound "Evacuation assistance will be finished" is output in S73. In a case where the evacuation vehicle follows a vehicle located immediately ahead of the evacuation vehicle in the process of S29, the evacuation path for the evacuation vehicle depends on the vehicle located immediately ahead of the evacuation vehicle. Once the vehicle located immediately ahead of the evacuation vehicle stops, however, a stopping process is executed in the evacuation vehicle by means of brake control. Accordingly, mode 7 subsequent to mode 6 is received in S55, and the sound "Evacuation assistance will be finished" is output in the vehicle located immediately ahead of the evacuation vehicle. Consequently, the driver of the vehicle located immediately ahead of the evacuation vehicle can understand that the evacuation of the evacuation vehicle has been completed.

In contrast, if the driver of a vehicle refuses a request for evacuation guidance though the vehicle is located immediately ahead of the evacuation vehicle, or if the own vehicle is not located immediately ahead of the evacuation vehicle, that is, if "No" is determined in S61 or S63, the following display process and sound output process are performed in S65 and S67. As illustrated in FIG. 3, in a case where the mode received in S55 is mode 4, an evacuation path for the evacuation vehicle is displayed on the display 3 in S65, and the sound "The evacuation vehicle will decelerate and move to the left side strip to stop" is output in S67. It is noted that if the own vehicle is not located immediately ahead of the evacuation vehicle and if the evacuation vehicle has started to follow another vehicle in the process of S29, the evacuation path may not be displayed and the current position of the own vehicle may be displayed. In a case where the mode received in S55 is mode 5, the sound "Please keep a distance from the evacuation vehicle. Please keep out of the path for the vehicle moving to the left side strip" is output in S67. In a case where the mode received in S55 is mode 6 or 7, the sound similar to that for a vehicle located immediately ahead of the evacuation vehicle is output.

[1-3. Effects]

According to the first embodiment described in detail above, the following effects can be obtained.

Figure 5:
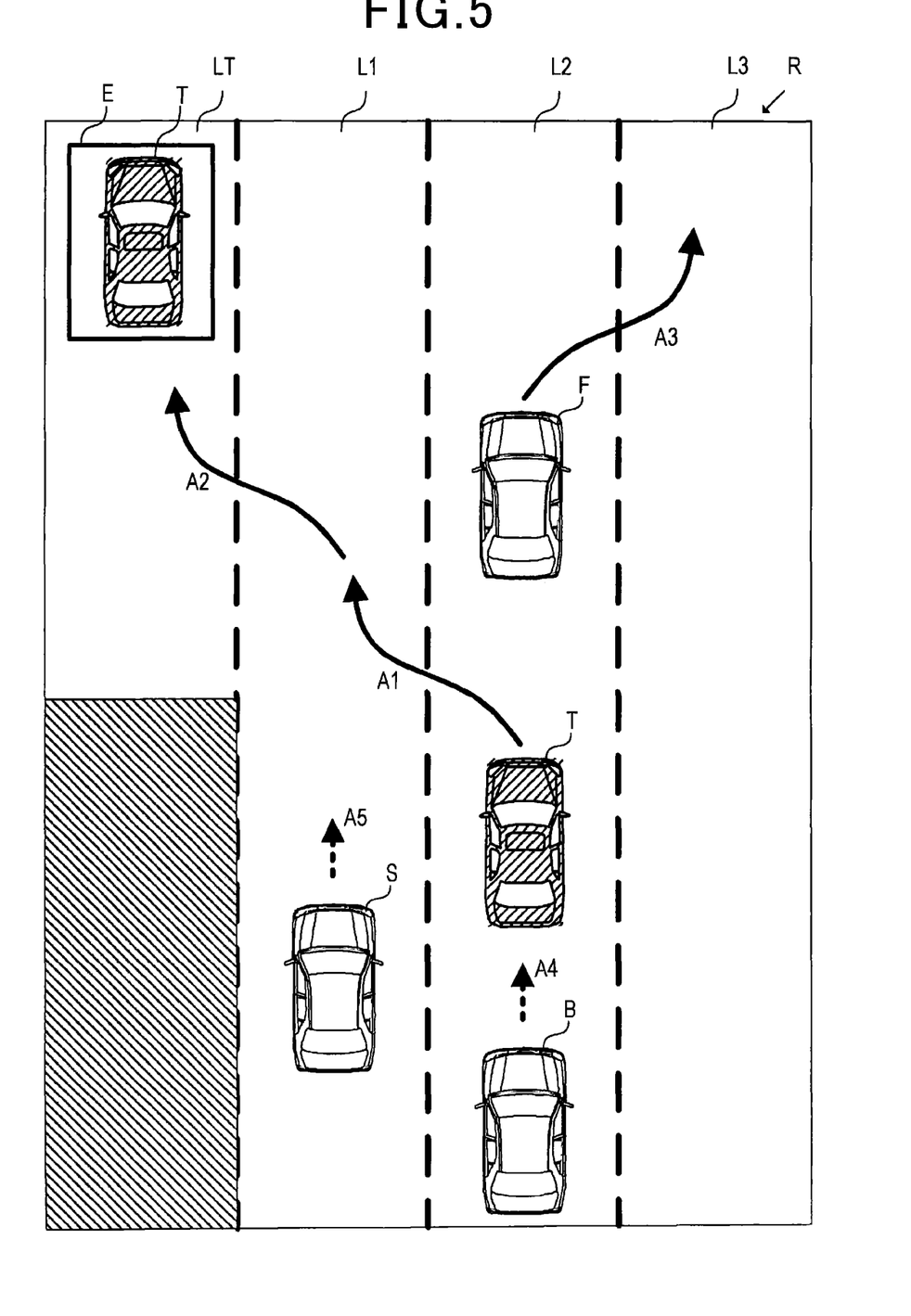
FIG. 5 is an explanatory diagram illustrating operations of vehicles when an evacuation vehicle is avoided by the process.
Figure 6:
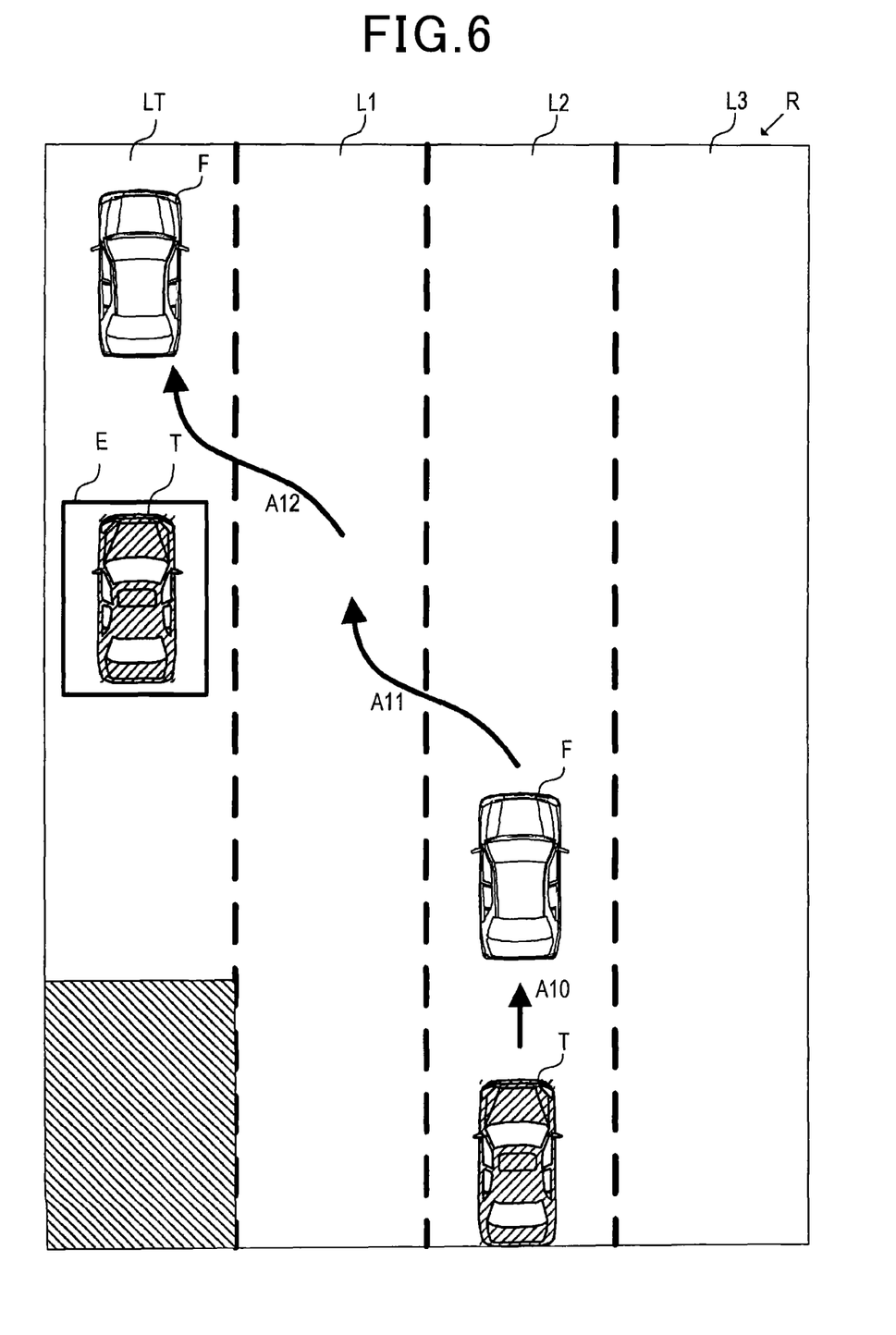
FIG. 6 is an explanatory diagram illustrating operations of vehicles when an evacuation vehicle is guided by the process.

(1A) For example, as illustrated in FIGS. 5 and 6, the following control is performed through the path setting process for an evacuation vehicle T whose driver is in an abnormal state. Suppose a road R on which the evacuation vehicle T is traveling has lanes L1 and L2 as driving lanes and a lane L3 as a fast lane in this order from the left, and partially has an evacuation lane LT as an evacuation road on the left side of the lane L1. First, a case where evacuation guidance is not performed will be described with reference to FIG. 5.

In this case, a stop position E in the evacuation lane LT is calculated in the process of S23. In the subsequent step S25, evacuation paths indicated by arrows A1 and A2 are calculated, and vehicle motion control is executed in S27 in accordance with the evacuation paths. Furthermore, in S9 subsequent to S27, information indicating that the evacuation vehicle T performs evacuation traveling along the evacuation paths indicated by arrows A1 and A2 is transmitted to vehicles around the evacuation vehicle T. Therefore, the following control is performed by the vehicles around the evacuation vehicle T.

Specifically, the evacuation paths are displayed in S65, and the sound for requesting the vehicles to keep a distance from the evacuation vehicle T to keep out of the evacuation paths is output in S67. Therefore, if the driver of a vehicle F traveling immediately ahead of the evacuation vehicle T does not accept the request for evacuation guidance, the driver keeps out of the evacuation paths by moving to the lane L3 different from the lanes L2 and L1 included in the evacuation paths for the evacuation vehicle T as indicated by an arrow A3 in FIG. 5. A vehicle B traveling behind the evacuation vehicle T decelerates to keep a distance from the evacuation vehicle T as indicated by an arrow A4. It is noted that the vehicle B may decelerate so that the distance from the evacuation vehicle T is increased or maintained. A vehicle S traveling adjacent to the evacuation vehicle T and behind the evacuation paths decelerates to keep out of the evacuation paths. In this manner, the drivers of the vehicles F, B, and S can drive their vehicles F, B, and S so as to prevent themselves from hindering the evacuation traveling of the evacuation vehicle T.

In the above embodiment, the evacuation paths are displayed, and the sound is output for requesting the vehicles to keep a distance from the evacuation vehicle and keep out of the evacuation paths. However, the present disclosure is not limited to this. For example, traveling paths or methods of traveling that the vehicles around the evacuation vehicle are expected to be recommended may be displayed or output as sound in the vehicles around the evacuation vehicle, as indicated by arrows A3, A4, and A5 in FIG. 5. In this case, the drivers of the vehicles F, B, and S can drive their vehicles F, B, and S more easily so as to prevent themselves from hindering the evacuation traveling of the evacuation vehicle T more successfully.

(1B) However, in the above embodiment, the evacuation paths are displayed in the vehicles F, B, and S around the evacuation vehicle T in the process of S65 corresponding to mode 4. Therefore, the drivers of the vehicles F, B, and S can drive their vehicles F, B, and S easily so as to prevent themselves from hindering the evacuation traveling of the evacuation vehicle T successfully.

(1C) Next, a case where evacuation guidance is performed will be described with reference to FIG. 6. In this case, once a request for evacuation guidance is accepted, the evacuation vehicle T follows the vehicle F traveling immediately ahead of the evacuation vehicle T as indicated by arrow A10. The driver of the vehicle F moves the own vehicle to the evacuation lane LT as indicated by arrows A11 and A12 in accordance with the sound output in the process of S73 corresponding to modes 4 and 5, that is, the sound for requesting the vehicle F to guide the evacuation vehicle T to a safe place. Once the vehicle located immediately ahead of the evacuation vehicle T stops, the evacuation vehicle T automatically stops, and the mode is changed to mode 7. Therefore, the evacuation vehicle T can be guided by the vehicle F so as to be evacuated from the lanes L1 to L3 more safely.

It is note that in this case, since the traveling path for the vehicle F depends on the driver of the vehicle F, the final stop position of the evacuation vehicle T does not necessarily coincide with the stop position E originally calculated. In the present embodiment, the process of displaying an evacuation path is not performed in vehicles around the evacuation vehicle when the evacuation guidance is performed. However, the present disclosure is not limited to this. For example, while mode 4 or mode 5 is received in the process of S55 by a vehicle located immediately ahead of the evacuation vehicle, the display of an evacuation path calculated in the evacuation vehicle on the display 3 may be performed together with the output of the sound "Please guide the vehicle to a safe place". In this case, the driver of the vehicle located immediately ahead of the evacuation vehicle can refer to the displayed evacuation path to guide the evacuation vehicle more smoothly, and the evacuation vehicle can be guided to a stop position calculated by itself in S23 more successfully. At this time, the speed of the evacuation vehicle may also be displayed in addition to the evacuation path.

(1D) In addition, in the above embodiment, the lighting system 5 and the horn 6 of the evacuation vehicle T are driven. Therefore, even when pedestrians or vehicles without the travelling support apparatus 1 are present around the evacuation vehicle T, the pedestrians or vehicles can notice that the evacuation vehicle T performs evacuation traveling.

(1E) In addition, in the above embodiment, the positional relation between the evacuation vehicle T and the own vehicle is reflected in the display process of S65 corresponding to mode 1 in the vehicles F, B, and S around the evacuation vehicle T. Therefore, the drivers of the vehicles F, B, and S can drive their vehicles F, B, and S more easily so as to prevent themselves from hindering the evacuation traveling of the evacuation vehicle T.

(1F) In addition, in the above embodiment, evacuation guidance is performed by the vehicle F only when the driver of the vehicle F pushes the acceptance switch 18. Therefore, the driver of the vehicle F can refuse a request for evacuation guidance when the driver is in a hurry, for example, and the degree of freedom and convenience of the entire traffic system can be improved.

It is noted that in the above embodiment, the map information acquisition section 11, the own vehicle information acquisition section 12, and the surrounding environment information acquisition section 13 correspond to an information acquisition section. The path setting section 16 corresponds to a path setting section, an information transmitting section, and a lighting system control section. The acceptance switch 18 corresponds to an acceptance determination section. The traveling instruction section 19 corresponds to a traveling instruction section and an acceptance transmitting section. In addition, the processes of S23 and S25 of the path setting process executed by the path setting section 16 correspond to the path setting section. The process of S9 corresponds to the information transmitting section. The process of S17 corresponds to the lighting system control section. In addition, the processes of S65 and S67 of the traveling instruction process by the traveling instruction section 19 correspond to the traveling instruction section. The process of S59 corresponds to the acceptance transmitting section.

2. Second Embodiment

[2-1. Difference from First Embodiment]

The basic configuration of the second embodiment is similar to that of the first embodiment. Hence, the description of common configurations will be omitted, and the difference will be mainly described. It is noted that reference signs identical to those of the first embodiment indicate the same components, and the preceding descriptions thereof are incorporated by reference.

In the above-described first embodiment, the drivers of vehicles around an evacuation vehicle drive their vehicles to avoid or guide the evacuation vehicle. The second embodiment is different from the first embodiment in that vehicles around an evacuation vehicle avoid or guide the evacuation vehicle by well-known automated driving (a kind of vehicle motion control). Specifically, the traveling instruction section 19 only needs to provide a method of traveling to the own vehicle in some form. In addition, as in the first embodiment, display and sound may be used to provide a method of traveling. In addition, as in the following second embodiment, a method of traveling may be provided to a control system for automated driving. In this case, the traveling instruction section 19 is also configured to be able to output signals to the driving support system 2 that serves as a control system for automated driving.

[2-2. Processes]

Figure 7:
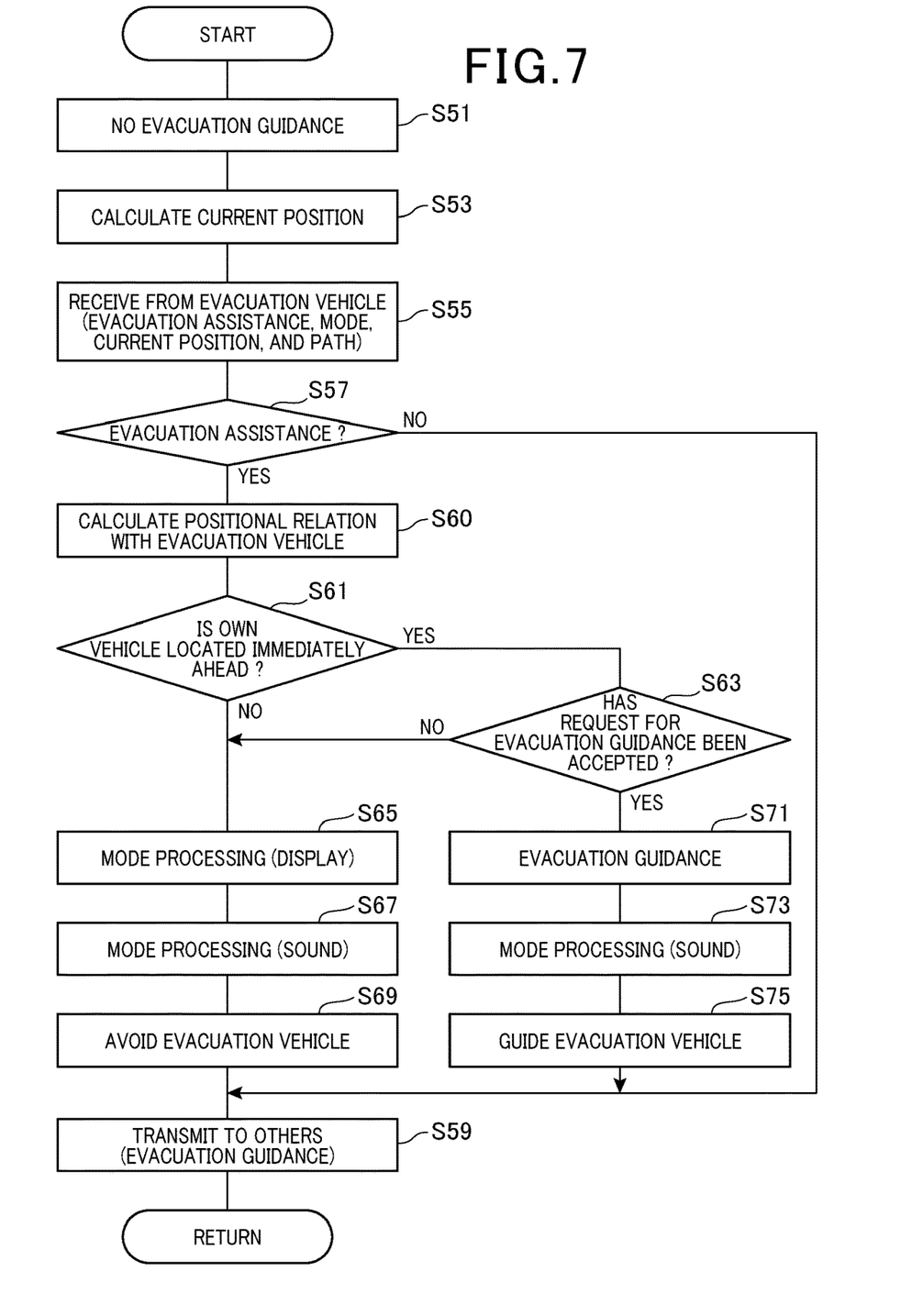
FIG. 7 is a flowchart illustrating a process of a traveling instruction section according to a second embodiment.

This embodiment can be implemented by changing the traveling instruction process of the first embodiment as illustrated in FIG. 7. As illustrated in FIG. 7, this process is similar to the traveling instruction process illustrated in FIG. 4 except that S69 and S75 are added after S67 and S73, respectively.

In S69, with reference to the evacuation path received in S55, automated driving is executed such that the evacuation vehicle and the evacuation path therefor are avoided. It is note that in this process, if the own vehicle is located ahead of the evacuation vehicle, the speed of the own vehicle at that time is maintained. If the own vehicle is located behind the evacuation vehicle and if the relative speed is zero or less, the speed of the own vehicle at that time is maintained. If the own vehicle is located behind the evacuation vehicle and if the relative speed is more than zero, the speed of the own vehicle is decreased so that the relative velocity approaches zero. It is noted that the relative speed is obtained by subtracting the speed of the evacuation vehicle from the speed of the own vehicle. In addition, in S75, with reference to the evacuation path received in S55, automated driving is executed such that the evacuation vehicle is led along the evacuation path. It is note that in the present embodiment, the processes of S69 and S75 also correspond to the traveling instruction section. In these processes, the traveling instruction section 19 instructs the driving support system 2 to perform traveling so as to avoid or guide the evacuation vehicle.

[2-3. Effects]

According to the second embodiment described above, the following effects can be obtained in addition to the effects (1A) to (1F) of the above-described first embodiment.

(2A) For example, the vehicles F, B, and S around the evacuation vehicle T illustrated in FIGS. 5 and 6 can be automatically driven along the paths indicated by arrows A3 to A5 or arrows A11 and A12. Therefore, the vehicles F, B, and S can be prevented from hindering the evacuation traveling of the evacuation vehicle T more successfully. In addition, if the driver of the vehicle F traveling immediately ahead of the evacuation vehicle T accepts a request for evacuation guidance, the evacuation vehicle T can be guided more smoothly, and the evacuation vehicle T can be guided to the stop position E calculated by itself in S23 more successfully.

It is noted that the techniques related to automated driving are classified as Level 1 (safe driving support system), Levels 2 and 3 (semi-automated driving system), and Level 4 (fully-automated driving system) according to how advanced automation is. This is described, for example, in "Cross-ministerial Strategic Innovation Promotion Program: Automated Driving Systems" published by the Cabinet Office in Japan in May 2015. In a case where control for avoiding or guiding an evacuation vehicle is performed by automated driving, the level of the automated driving may be any of Levels 1 to 4. Information that is provided to the drivers of vehicles around an evacuation vehicle through display or sound output desirably varies according to the level of automated driving in the vehicles around the evacuation vehicle.

3. Other Embodiments

The present disclosure has been described with reference to the embodiments, but it is to be understood that the present disclosure is not limited to the embodiments. The present disclosure covers various modifications and equivalent variations. In addition to various combinations and forms, other combinations and forms including one or more/less elements thereof are also within the spirit and scope of the present disclosure.

(3A) In each of the above embodiments, the lighting system 5 and the horn 6 are driven in the process of S17 to inform vehicles and pedestrians around the own vehicle that the own vehicle is an evacuation vehicle. However, the present disclosure is not limited to this. For example, either the lighting system 5 or the horn 6 may be driven, or neither the lighting system 5 nor the horn 6 may be driven. Even when neither the lighting system 5 nor the horn 6 is driven, vehicles around an evacuation vehicle can notice the presence of the evacuation vehicle by receiving information from the evacuation vehicle.

(3B) In each of the above embodiments, the control for causing an evacuation vehicle to be guided by a vehicle located immediately ahead of the evacuation vehicle and the control for causing an evacuation vehicle to perform evacuation traveling along an evacuation path calculated by itself can be executed. However, only the latter control may be executed. Such an embodiment can be implemented by omitting the processes of S3, S21, S29, S51, S59, S61, S63, S71, S73, and S75 from each of the above embodiments. In this case, the sound and display in a vehicle located immediately ahead of an evacuation vehicle are similar to the sound and display described in the column "others <excluding left item>" in FIG. 3 except that the positional relation between the own vehicle and the evacuation vehicle is reflected. Furthermore, the process of S60 may also be omitted. If S60 is omitted from the first embodiment, the drivers of vehicles around an evacuation vehicle determine which vehicle is the evacuation vehicle with reference to hazard lamps blinking, transmitted evacuation paths, and the like, and drive the own vehicles so as to avoid the evacuation vehicle.

(3C) In each of the above embodiments, an evacuation path is transmitted from an evacuation vehicle. However, the present disclosure is not limited to this. For example, information indicating the presence of an evacuation vehicle (e.g., the evacuation assisting flag) may be transmitted alone, and the evacuation vehicle may control the lighting system 5 or the like to inform others which vehicle is the evacuation vehicle. In this case, an evacuation path for the evacuation vehicle may be estimated individually by vehicles around the evacuation vehicle. Such an embodiment can be implemented by omitting the transmission of an evacuation path from the process of S9. In this case, the process of displaying an evacuation path in S65 by vehicles around the evacuation vehicle is not executed.

(3D) The above embodiments may be changed such that an evacuation vehicle is more likely to be guided. For example, if a vehicle traveling immediately ahead of the evacuation vehicle refuses a request for evacuation guidance or if the vehicle traveling immediately ahead of the evacuation vehicle is not equipped with the travelling support apparatus 1, control may be performed so as to request a vehicle capable of performing evacuation guidance to cut in front of the evacuation vehicle.

(3E) In the second embodiment, in a case where vehicles around an evacuation vehicle avoid the evacuation vehicle by automated driving, the traveling paths for the vehicles around the evacuation vehicle are not limited to those illustrated in FIG. 5. For example, appropriate traveling paths may be set in accordance with the desire of the drivers of the vehicles around the evacuation vehicle (for example, whether they are in a hurry) or with traffic conditions. For example, the vehicle F in FIG. 5 may accelerate to keep a distance from the evacuation vehicle T. Also in a case where traveling paths (e.g., arrows A3 to A5) or methods of traveling that the vehicles around the evacuation vehicle are expected to be recommended are displayed or output as sound as in the first embodiment, appropriate traveling paths and the like may be set in accordance with the desire of the drivers of the vehicles around the evacuation vehicle or with traffic conditions.

(3F) The modes illustrated in FIG. 3 are only examples, and may be subdivided into smaller phases or may be integrated into larger phases. The display and sound output that are executed in each mode can also be variously changed.

(3G) The acceptance determination section only needs to determine whether the driver has accepted a request for evacuation guidance, and is not limited to a component that is pushed with the driver's finger, such as the acceptance switch 18 in each of the above embodiments. For example, the acceptance determination section may be pushed by the driver's foot, or may detect a movement of the driver's face (e.g., a nod) or the like. In addition, the acceptance determination section need not necessarily be provided. Processes may always be performed as if a request was accepted with the acceptance switch 18 or as if a request was not accepted with the acceptance switch 18.

(3H) In each of the above embodiments, both the path setting process and the traveling instruction process are executed in the travelling support apparatus 1. However, the present disclosure is not limited to this. Only one of the path setting process and the traveling instruction process may be executed in the travelling support apparatus 1.

(3I) In each of the above embodiments, a plurality of functions of a single component may be implemented by a plurality of components, or a single function of a single component may be implemented by a plurality of components. A plurality of functions of a plurality of components may be implemented by a single component, or a single function that is implemented by a plurality of components may be implemented by a single component. Part of the configuration of each of the above embodiments may be omitted. At least part of the configuration of each of the above embodiments may be added to or replaced by the configuration of another embodiment.

(3J) The present invention can be implemented not only by the above-described travelling support apparatus but also by a system including the travelling support apparatus as a component, a program for allowing a computer to function as the travelling support apparatus, a non-transitory tangible storage medium such as a semiconductor memory storing the program therein, a traveling support method, and various other forms.

The invention claimed is:

1. A travelling support apparatus for an own vehicle comprising:
   a processor;
   a non-transitory computer-readable storage medium; and
   a set of computer-executable instructions stored on the non-transitory computer-readable storage medium that cause the processor to:
   communicate with an another vehicle around the own vehicle, the own vehicle being a vehicle equipped with the travelling support apparatus;
   determine whether a driver of the own vehicle is capable of driving appropriately;
   set an evacuation path for bringing the own vehicle to an emergency stop on the basis of an algorithm when determining that the driver is incapable of driving appropriately;
   acquire various types of information required for execution of the algorithm;
   perform an evacuation traveling of the own vehicle to bring the own vehicle to the emergency stop along the evacuation path; and
   transmit to the another vehicle around the own vehicle information indicating that the own vehicle performs the evacuation traveling, wherein for a state in which the another vehicle receives information indicating that the evacuation traveling of the own vehicle is being performed, the processor performs the evacuation traveling of the own vehicle by causing the own vehicle to follow the another vehicle.

2. The travelling support apparatus according to claim 1, wherein the set of computer-executable instructions further cause the processor to turn on, turn off, or blink a light that emits light toward outside of the own vehicle to inform own vehicle's surroundings that the own vehicle performs the evacuation traveling.

3. The travelling support apparatus according to claim 1, wherein the information indicating that the own vehicle performs the evacuation traveling includes information on the evacuation path.

4. The travelling support apparatus according to claim 3, wherein the set of computer-executable instructions further cause the processor to, if the own vehicle is traveling ahead of an evacuation vehicle, instruct the own vehicle to move to a lane different from a lane included in the evacuation path for the evacuation vehicle.

5. The travelling support apparatus according to claim 3, wherein the set of computer-executable instructions further cause the processor to, if the own vehicle is traveling behind an evacuation vehicle, instruct the own vehicle to decelerate so as to increase or maintain a distance from the evacuation vehicle.

6. The travelling support apparatus according to claim 3, wherein the set of computer-executable instructions further cause the processor to:

determine whether a driver of the own vehicle has accepted a request to travel to guide an evacuation vehicle; and transmit, when determining that the driver of the own vehicle has accepted the request, information indicating that the own vehicle guides the evacuation traveling to the evacuation vehicle.

\* \* \* \* \*